US007975535B2

(12) United States Patent
Cueto

(10) Patent No.: US 7,975,535 B2
(45) **Date of Patent: *Jul. 12, 2011**

(54) METHOD AND SYSTEM FOR TESTING A FUEL INJECTOR

(76) Inventor: Omar Cueto, Jacksonville, FL (US)

( * ) Notice: Subject to any disclaimer, the term of this patent is extended or adjusted under 35 U.S.C. 154(b) by 168 days.

This patent is subject to a terminal disclaimer.

(21) Appl. No.: 12/233,615

(22) Filed: Sep. 19, 2008

(65) Prior Publication Data

US 2009/0277258 A1 Nov. 12, 2009

Related U.S. Application Data

(63) Continuation-in-part of application No. 12/117,750, filed on May 9, 2008.

(51) Int. Cl.
*G01M 15/09* (2006.01)

(52) U.S. Cl. .................................. 73/114.48; 73/114.51

(58) Field of Classification Search ............... 73/114.45, 73/114.46, 114.47, 114.48, 114.49, 114.51
See application file for complete search history.

(56) References Cited

U.S. PATENT DOCUMENTS

| | | | | |
|---|---|---|---|---|
| 6,532,809 | B2 * | 3/2003 | Robinson | 73/114.45 |
| 6,817,233 | B2 * | 11/2004 | Toiyama et al. | 73/114.48 |
| 7,197,918 | B2 * | 4/2007 | Shen | 73/114.51 |
| 7,472,586 | B2 * | 1/2009 | Niimi et al. | 73/114.42 |
| 2002/0174717 | A1 * | 11/2002 | Toiyama et al. | 73/118.1 |
| 2005/0034514 | A1 * | 2/2005 | Shen | 73/119 A |
| 2005/0150271 | A1 * | 7/2005 | Klopfer et al. | 73/1.36 |
| 2006/0101922 | A1 * | 5/2006 | Niimi et al. | 73/861.57 |
| 2007/0240500 | A1 * | 10/2007 | Pollard et al. | 73/119 A |
| 2009/0007695 | A1 * | 1/2009 | Araki et al. | 73/861.47 |
| 2009/0114035 | A1 * | 5/2009 | Lehnert | 73/861 |

* cited by examiner

*Primary Examiner* — Eric S McCall
(74) *Attorney, Agent, or Firm* — Rogers Towers, P.A.; Stephenq E. Kelly; Thomas C. Saitta

(57) ABSTRACT

Disclosed is both an apparatus and method for quantifying an injection event of a fuel injector, including both multiple pulse and single pulse injection events. Typically, the fuel injector is a common rail injector. The apparatus includes a pressure chamber for isolating a portion of the injection pressure for reducing pressure waves and reflections which can create “noise” in the detection of an injection pressure. The invention further includes determining the precise start and end times of injection using cavitation created by the injection event by determining the intensity of light within a spray chamber.

25 Claims, 4 Drawing Sheets

METHOD AND SYSTEM FOR TESTING A FUEL INJECTOR

RELATED APPLICATION

Figure 1:
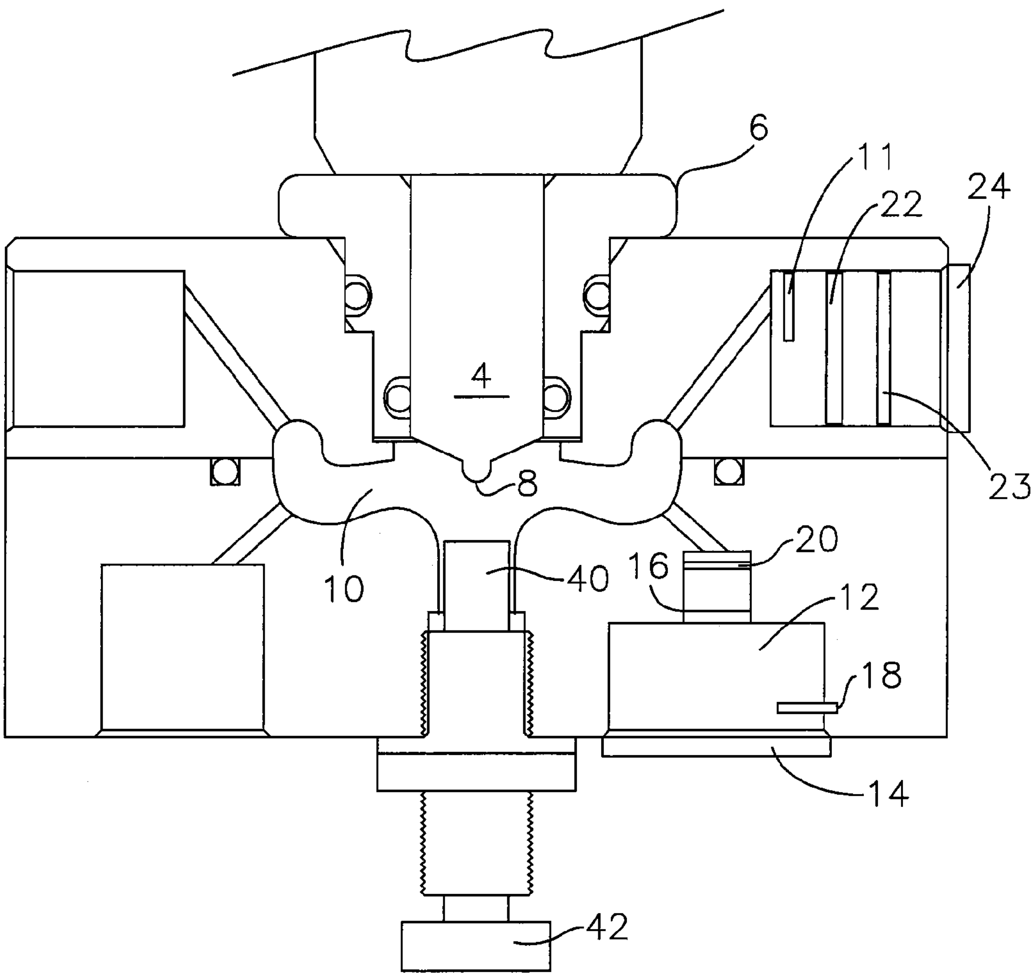

This application is a continuation-in-part of U.S. patent application Ser. No. 12/117,750, filed May 9, 2008, the contents of which are hereby incorporated in their entirety.

TECHNICAL FIELD

The present invention relates to an apparatus and method for measuring injected fuel. In greater detail, the present invention relates to a method and apparatus for determining the quantity and rate shape of injection by a fuel injector for testing the injector.

BACKGROUND

The development of multi-pulse common rail injection systems in which fuel injectors are actuated to provide pilot and/or post injections as well as the primary or main injection has prompted the need for new, end-of-the-line, functional test equipment that can measure the fuel injected by the fuel injector.

While positive displacement systems connected to a highly accurate electronic displacement measuring system are sufficiently accurate to measure multi-pulse common rail injection systems, they are typically very complex and expensive. Consequently, such positive displacement, piston type measurement systems, are not suitable for use in the manufacturing assembly line environment where numerous systems are required to test a significant number of fuel injectors.

An example of an alternative method to positive displacement includes a common-rail fuel injection rate measurement system consisting of a pressure chamber with pressure sensors, an amplifier box, an output processing unit, a data processing unit, and a volumetric flow-meter. The system also includes a back pressure sensor, a temperature sensor, a back pressure relief valve, and a discharge valve.

However, such known systems require complex processing and filtering of captured sensor output to derive information regarding the fuel injection quantity, variation, and/or rate shape. Such filtering and complex processing is necessary to remove the noise in the acquired data caused by the fuel pressure pulses reflected within the system.

Unfortunately, developing such extensive filters and processing methods is expensive. Furthermore, filtering and processing sensor output can decrease the accuracy of the system since the quality of the filters and methods used to process the sensor data can render the results inaccurate. Often, the resolution of the apparatus is not able to resolve the microsecond difference between the twin rate peaks of a multi-pulse common rail injection system.

Therefore, what is needed is a testing apparatus and method which is relatively inexpensive and capable of rendering accurate readings in both single and multi-pulse common rail injection systems.

SUMMARY

The present invention comprises both an apparatus and method for quantifying an injection event including both multiple pulse and single pulse injection events. The apparatus includes a pressure chamber for isolating a portion of the injection pressure for reducing pressure waves and reflections which can create “noise” in the detection of an injection pressure.

The apparatus and method further include determining the start of injection and end of injection for increased resolution for determining multiple pulse injection events. The start and stop time of the injection is determined by an increase in measured light intensity within the spray chamber. The apparatus and method are capable of providing a highly accurate profile of an injector's performance.

In greater detail, the present apparatus for testing fuel injectors includes a fixture assembly capable of receiving a fuel injector. A spray chamber is housed within the fixture assembly and sized to receive the nozzle tip portion of the injector. The spray chamber receives fluid injected by the injector during an injection event. The apparatus further includes a pressure sensor and a flow meter fluidly connected to the spray chamber measuring a flow of the injected fluid.

The start and stop times of injection are determined in part by using a fiber optic operatively aligned with the nozzle tip whereby light is directed into the chamber and towards the nozzle tip. The intensity of the light is detected using an optical detection assembly for detecting the intensity of light within the chamber which determines in part the start time of injection upon an increase in light intensity.

The fiber optic may include at least one fiber for emitting a light and at least one fiber for receiving a light. The optical detection assembly may include a fiber optic for receiving a light within the chamber and directing the received light to a computing device for quantifying the intensity of the light. In a further embodiment the computing device and the optical detection assembly may be combined into one unit. Cavitation can be detected within the spray chamber indicating an injection event upon the detection of an increase in intensity of the received light. The computing device may also be electronically connected to the flow meter, pressure sensor along with the optic assembly.

A further embodiment includes an apparatus for testing a fuel injector including a fixture assembly having an injector receiving opening sized to receiving a fuel injector and a spray chamber housed within. The spray chamber is sized to receive the nozzle tip portion of the injector. Further included is a pressure chamber connected to the spray chamber and housing a pressure sensor.

The apparatus further includes an isolating orifice fluidly connected to both the spray chamber and the pressure chamber for isolating and restricting the flow of injected liquid between the spray chamber and the pressure chamber. The above assembly greatly reduces the pressure waves and reflections within the pressure chamber for reducing noise in the recording of a pressure reading by the pressure sensor. A flow meter may be included which is fluidly connected to the spray chamber measuring a flow of the injected fluid.

The start and stop times of injection are determined optically via a determined measured light intensity. The injection timing assembly includes a fiber optic operatively aligned with the nozzle tip whereby light is directed into the chamber and towards the nozzle tip. An optical detection assembly is provided for detecting the intensity of light within the chamber.

A further embodiment includes a method of measuring an amount of fuel injected by a fuel injector comprising the step of securing a fuel injector to a fixture assembly for capturing fuel injected by the fuel injector. The method additionally includes actuating the fuel injector to create fuel injection event into a spray chamber and measuring the pressure of the fuel injected into the spray chamber. Also included in the method are the steps of measuring the flow of fuel from the injector during the injection event and directing light into the spray chamber. The start and stop times of injection are determined by measuring the change in intensity of within the spray chamber.

DRAWINGS

Figure 2:
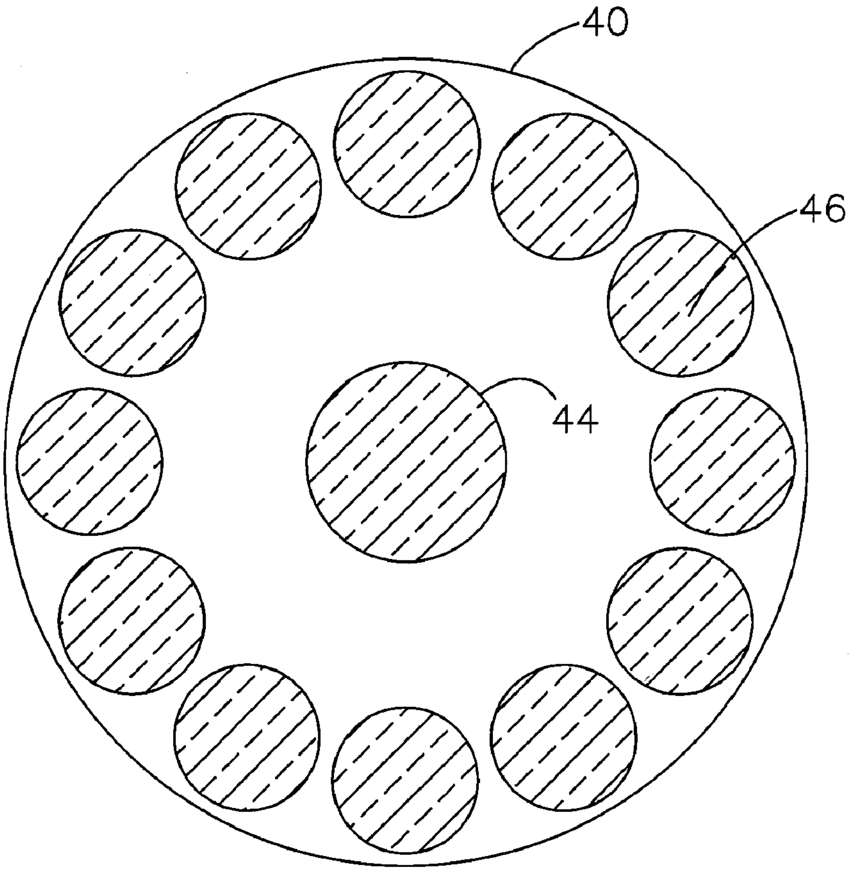
Figure 3:
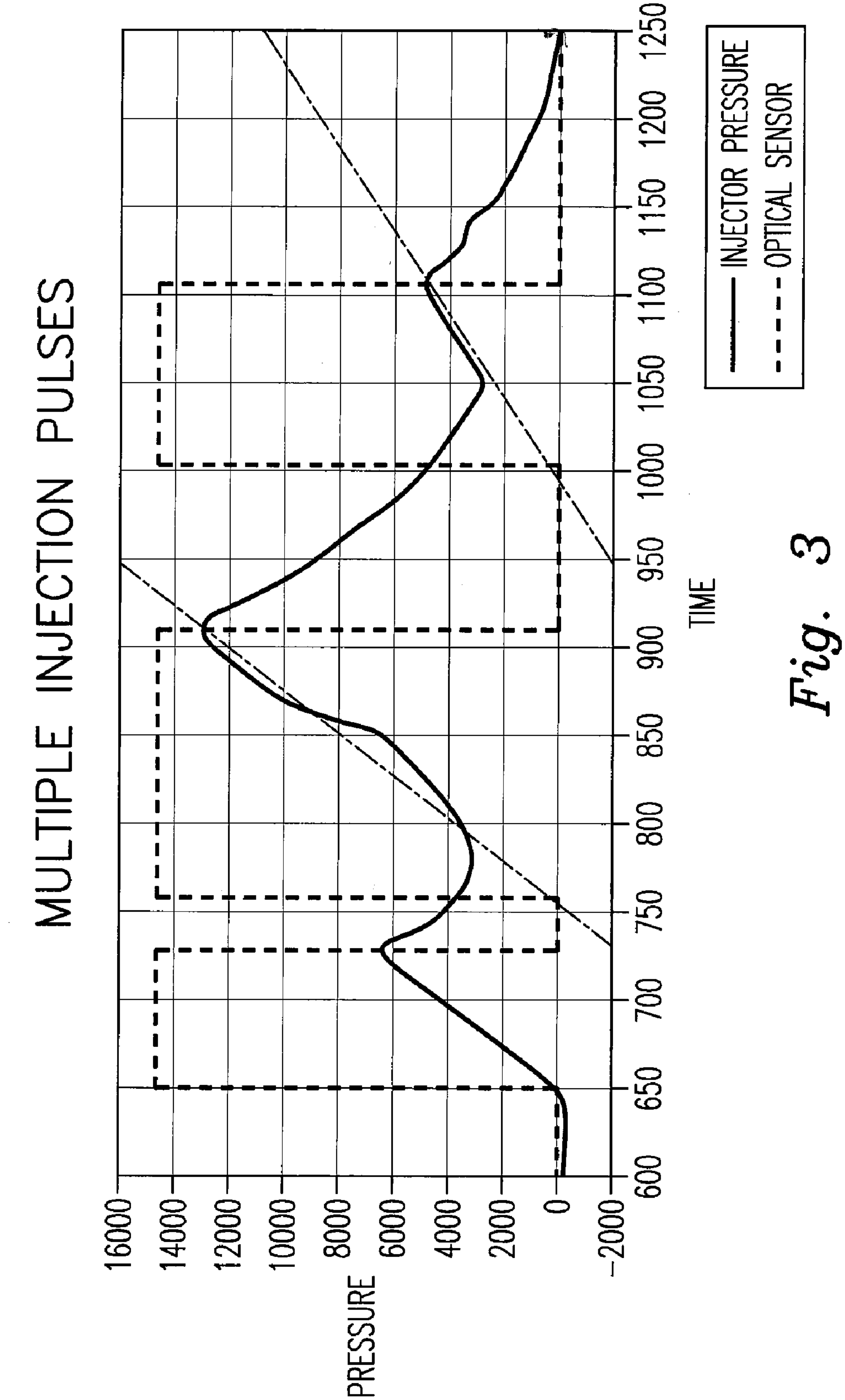
Figure 4:
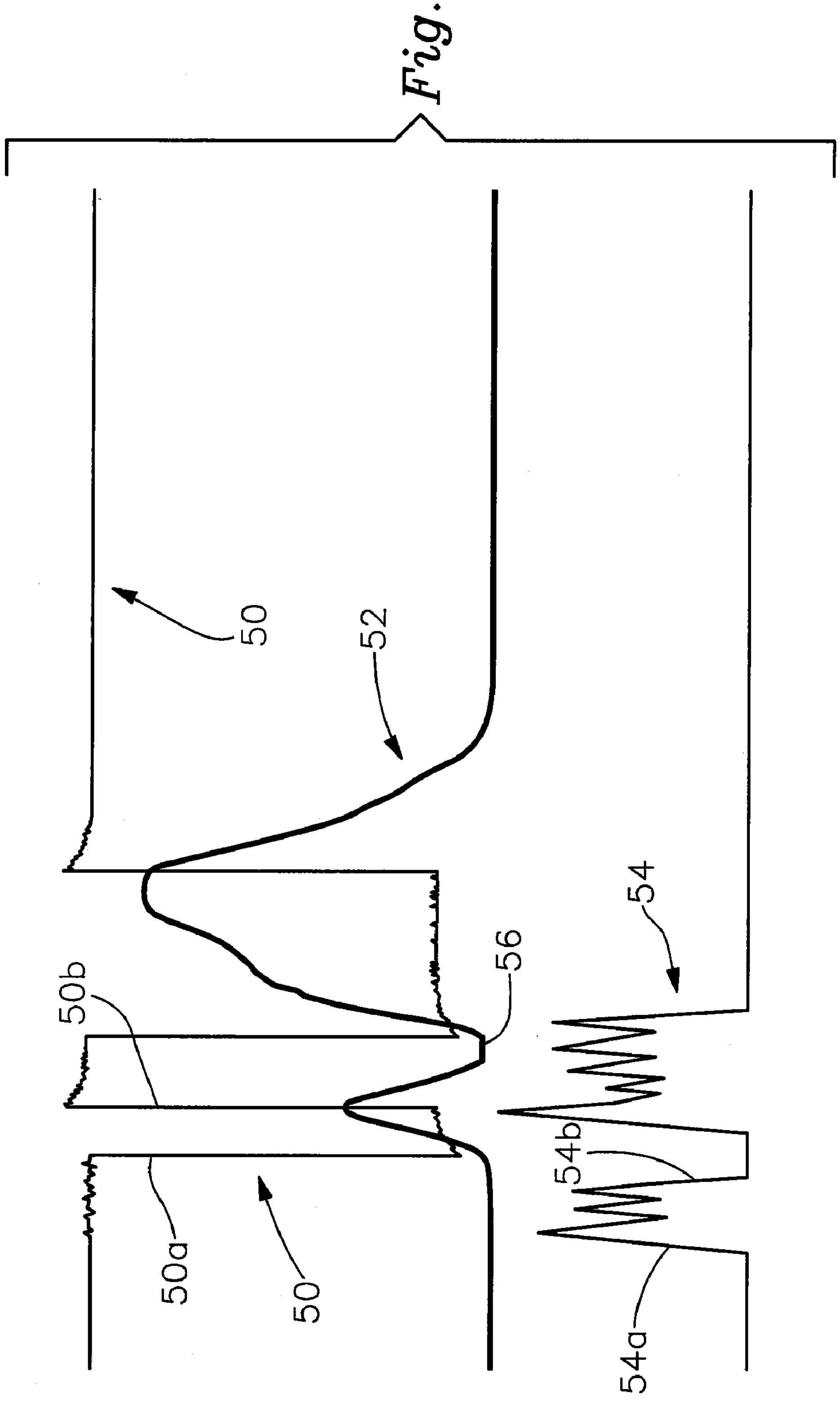

In the drawings:

FIG. 1 is a schematic illustration of the present apparatus for testing a fuel injector in accordance with one embodiment of the present invention;

FIG. 2 is a cross sectional view of an embodiment of the fiber optic assembly having a plurality of detecting fibers and one emitting fiber providing light to the spray chamber; and FIG. 3 depicts overlapping multiple injection pulses shown as solid lines and the optical pickup sensor or diode detector sensor or power amp of the present apparatus showing the start and stop times for injection as broken lines on the graph such that the slanted line going from the start of injection time to the peak of injector pressure can be used to extrapolate the rising pressure waveform to calculate volumetric flow rates; and FIG. 4 is a graph of the injection event measuring the start and stop times of injection by optical detection, electrical current to the injector and by the pressure trace.

DETAILED DESCRIPTION

Disclosed is both an apparatus and method for quantifying an injection event including both multiple pulse and single pulse injection events. The apparatus includes a pressure chamber for isolating a portion of the injection event. By isolating the event, the apparatus reduces the pressure waves and reflections which can create "noise" in detecting the injection pressure. The apparatus may further include detecting the start and stop times of injection using an optical timing device based upon the opaque properties of cavitation.

While the present apparatus and method are especially advantageous when implemented to measure fuel injection quantity, variation, and/or rate of multi-pulse injections, such may also be used to measure the parameters of fuel injectors operable in a conventional, single injection pulse manner. As can be appreciated by one of ordinary skill in the art, multi-pulse common rail injection systems may be operated in a conventional manner to provide a single pulse injection. The present invention may be used to accurately measure both single and multiple pulse injections.

The term "light" is used herein to encompass the detectable electromagnetic spectrum capable of being scattered by the cavitation produced by the injected liquid. In one embodiment, "light" may be defined as the viewable light of the electromagnetic spectrum.

Referring now in greater detail to the drawings in which like numerals indicate like items throughout the several views, FIGS. 1-4 depict the present apparatus and method of quantifying an injection event including both multiple pulse and single pulse injection events, in the various embodiments of the present invention.

FIG. 1 illustrates the present apparatus for testing fuel injectors. Illustrated within the figure is a fixture assembly 6 capable of receiving a fuel injector 4 and may include a bushing of varying sizes to accommodate various injector of different sizes. The fixture assembly 6 includes an opening sized to fit a fuel injector 4 to be tested. The fuel injector 4 is inserted into the receiving opening of the fixture assembly and secured within the fixture assembly 6. The fuel injector 4 may provide a single pulse injection, or a multi-pulse injection. The fuel injector 4 may be fluidly connected to a fuel supply (not shown) for providing pressurized fuel to the fuel injector 4.

While fuel is described as being provided, it is contemplated by the Applicant the term "fuel" includes any liquid which can be injected via the spray tips of the injector 4.

An embodiment of the spray chamber 10 is illustrated in FIG. 1 showing the spray tip 8 of the injector 4 fitted within the spray chamber 10. As shown in FIG. 1 the spray chamber 10 is formed from a cavity created within the fixture assembly 6. The spay chamber 10 may be formed in two parts for machining purposes and have a pancake appearance. However, the spray chamber 10 may have various configurations and dimensions.

Fluidly connected to the spray chamber 10 is a pressure chamber 12 housing a pressure sensor 14. The pressure sensor 14 is adapted to measure the pressure changes of the fuel or liquid within the pressure chamber 12 to provide a pressure output, e.g. output signal. The pressure changes correspond to the amount of fuel injected by the fuel injector 4, and is correlated to the rate shape peak of the injection when the injector is actuated. The pressure within the pressure chamber 12 corresponds to the pressure within the spray chamber 10.

An isolating orifice 16 regulates and isolates the flow of fluid from the spray chamber 10 to the pressure chamber 12 to greatly reduce noise when detecting a pressure reading. The isolating orifice 16 may be a fixed orifice or a variable orifice. Such noise is typically caused by the swirling pressure waves and reflections associated with the injection event. In greater detail the isolating orifice 16 may be a metering valve provided for regulating and restricting the flow of fluid from the spray chamber 10. The metering valve may be a needle valve used to restrict the flow of the injected liquid between the spray chamber 10 and the pressure chamber 12. The isolating orifice 16 is fluidly connected to both the spray chamber 10 and the pressure chamber 12.

Additionally, as shown in FIG. 1 the fixture assembly 6 may include a bleed valve 18 for allowing air to be purged from fixture assembly 6 or pressure chamber 12 before measurement begins. Furthermore, a valve assembly 20 can be fluidly connected to the spray chamber and pressure chamber 12 for closing the pressure chamber 12 to the spray chamber 10 may be included in an embodiment of the present apparatus.

A flow meter 24 is included within the present apparatus is fluidly connected to the spray chamber 10. The flow meter 24 is adapted to measure the flow of liquid dispersed by the spray tip 8 of the injector 4 during an injection event. The flow meter 24 may be for example a highly accurate electronic positive displacement flow meter. Of course the present apparatus is not limited by any one type of flow meter.

Additionally included in an embodiment is a valve assembly 22 as shown in FIG. 1 is fluidly connected to both the flow meter 24 and the spray chamber 10. The valve assembly 22 may be for example an adjustable metering valve with a position sensing stepper motor or servo motor attached for automation positioning.

In an additional embodiment, a dampener 23 is included for dampening the flow fluctuations to the flow meter 24. The dampener 23 is placed before and is in fluid communication with the flow meter 24 so as to dampen such flow fluctuations. The dampener 23 may be also located in the spay chamber 10. In an embodiment, the working dampening of the dampener 23 is about 15 times less than the natural resonator frequency is about 130 Hz in an embodiment. Thus, 15 times less than the natural resonator frequency works out to be about less than 10 Hz, (130/15=8.6 Hz). In one embodiment the dampener 23 may be a small low pressure gas in elastomer bladder type pulsation damper. Of course other types of dampeners 23 may be used in conjunction with the present apparatus such as spring/bellows dampers and the like.

A computing device for receiving input from the sensors for providing injection information quantifying the injection event and resulting pulses. The computing device 42 stores the various outputs from the pressure sensor 14, the flow meter 24, and the fiber optic assembly 40. Example additional sensors include those providing temperature readings 11 and current probes. In one embodiment the optical detection assembly and some or all of the functions of the computing device may be combined into one unit performing all or part of the functions of both. For example a power amplifier, such as that available from Panasonic Electric Works Corporation of America of New Providence, N.J., part number FX-300.

After a predetermined number of consecutive injection events are measured and stored, the computing device 42 may average the injection flow measured by the flow meter 24 with the pressure 14 output. In this regard, the computing device 42 may be provided with a software program therein for performing and/or facilitating such computations. Corrections to the calculated values may be made to compensate for back pressure, temperature, and viscosity of the fuel, to obtain the desired injection information.

A further embodiment includes combining the flow meter 24 output, pressure sensor 14 output and the output acquired from the fiber optic assembly 40 which determines the start and stop times for the injection event. By combining the above, the present apparatus is able to achieve in an embodiment a resolution of about 50 micro seconds. It also contemplated in a further embodiment that resolutions of 1 to 10 micro seconds are possible. Also contemplated are resolutions of less than 1 micro second.

As shown in FIG. 3 there is depicted overlapping multiple injection pulses and the differentiation of the pulses resulting in the extremely fine resolution discussed about. Using only the injector pressure waveform (as shown as a solid line), the start of injection or valve opening of the 2" and 3$^{rd}$ pulses are not discernable. By combining the pressure waveform with the optical sensor waveform (as shown in broken lines), the precise location of valve activation (opening) coincides with the positive going edge of the optical sensor waveform. The slanted extrapolation line, as shown in FIG. 3, rising from the start of injection time (broken line, as determined by the optical pickup sensor or diode detector sensor fiber optic waveform up to the peak of the injection pressure (solid line, as determined by the injector pressure waveform) may be used to extrapolate the rising pressure waveform which can be used to calculate volumetric flow rates represented by the area under the resulting curve.

The start and stop times of injection are determined using the opaque properties of cavitation and its ability to scatter light which is detected in the present apparatus as an increase in intensity of light. The injection event creates cavitation within the spray chamber 10 as the liquid exits the spray holes of the spray tip 8. The start and stop times of injection can be determined by the increase and decrease of intensity of light present within the spray chamber 10.

Cavitation detection may be further enhanced by adding backpressure to the spray chamber 10 of up to about 1.5 to 3 percent of the injector pressure, or in an alternative embodiment about 2 percent. Thus, for example if the injector pressure is 1000 psi the back pressure could be about 20 psi. Backpressure essentially "sharpens" or focuses the cavitation spray plume. If too much back pressure is added the cavitation plume will dissipate.

Intensity of Light

Cavitation and injection are detected by the increase of intensity of light within the spray chamber 10. Light is provided into the spray chamber in one embodiment via a fiber optic 44. However, in further embodiments the light may be emitted into the chamber through a light emitter via any known means such as through ports in the spray chamber 10, diodes within the chamber and other known means. The light may be any detectable electromagnetic radiation of the electromagnetic spectrum susceptible to the opaque properties of the cavitation produced by the sprayed liquid.

In one embodiment, as illustrated in FIG. 2, a fiber optic assembly 40 is used to both introduce light into the spray chamber 10 and to detect the intensity of the light within the chamber 10. As illustrated, various fiber optics 46 surround a core optic 44 within the fiber optic assembly 40. The fiber optics surrounding 46 the core optic 44 may in an embodiment detect the intensity of light within the chamber and the core optic 44 transmits a light into the chamber 10. The number of detecting fibers 46 and emitting fibers 44 may vary from that depicted in FIG. 2. In an embodiment the distance to nozzle 4 and fiber 40 is about ¼ of an inch. Furthermore, the tip 8 of the nozzle 4 can be colored with gun blue to darken the chrome surface of the nozzle to help reduce the reflection when there is no injection. Furthermore, gun blue may be added to the interior of the chamber 10 to reduce reflections.

The fiber optic assembly 40 may be positioned just before the spray tip 8 forming a gap between the fiber optic assembly 40 and the spray tip 8. Typically, the gap is less than 0.5 inches, and in a further embodiment the gap is less than 0.25 inches and in a further embodiment the gap is less than 0.1 inches.

The fiber optic assembly 40 may be operatively connected to a power amplifier then to computing device 42 providing light to the emitting optic fiber 44 and acquiring a detected light intensity from the detecting fibers 46. The computing device 42 may provide light to the emitting optic fiber 44 via a diode. The computing device 42 further quantifies the acquired light from the detecting fibers 46 and assigns the detected light an intensity value. For example, the light may be assigned a value based on units of LUX or LX.

The computing device 42 detects an injection event by comparing a background reading of light intensity to an increase in light intensity reading. The background intensity reading is a light intensity from nozzle tip in the spray chamber 10 when cavitation is absent. This reading may be labeled as "Object Absent". The computing device 42 compares any new light intensity reading acquired to the "Object Absent" light intensity value. An increase in light intensity above the "Object Absent" value would indicate the present of cavitation within the spray chamber 10. Of course various measures may be taken to compare only values of certain amount of intensity over the "Object Absent" value to indicate cavitation. The "Object Present" value may represent the increased light intensity acquired by the computing device 42 in a cavitation event.

In greater detail, cavitation indicates an injection event within the spray chamber 10. The start and stop times of cavitation correlate to the start and stop times of injection by the injector 4. Cavitation causes the light that would normally bounce off of the nozzle tip 8 and surrounding spray chamber 10 area to be refracted and scattered by the bubbles and increasing the light intensity that is picked up by the receiving fibers 46 and passes through to the optical circuit on the computing device. The computing device 42 takes the signal generated and assigns it a numerical value quantifying the light intensity in units of LUX or LX. The computing device 42 is taught to view this intensity as "Object Present" and the computing device 42 assumes a threshold value in between the "Object Present" and "Object Absent" intensities.

FIG. 4 depicts the injection event graphically measuring the start and stop times of injection by optical detection 50, electrical current 54 and pressure trace 52. As the dwell time between multiple injection events shortens, an overlap 56 in the pressure trace occurs.

In the present apparatus, injectors may be tested by combining the three signals described above. The electrical current signal 54 is the detection of the current applied to the solenoid or piezoelectric actuator triggering the injection event. The start time of injection 54*a* and stop time for injection 54*b* can be seen in the electrical current signal 54. The electric current signal 54 essentially measures the start and stop times of injections based upon when the injector was told to start and stop the injection event.

The optical detection 50 signal of the present apparatus indicates the presence and absence of cavitation within the spray chamber 10. The presence of cavitation indicates the start of injection and the absence indicates the end of injection. The start of injection 50*a* and end of injection 50*b* can be seen in the optical detection 50 signal.

The final signal used is the pressure trace 52, which shows, in real time, the calibrated pressure injection profile.

In the measuring of multiple injections of an injector two injection patterns are produced corresponding to short and long dwell times between injections. Where the dwell interval between injection events is long, no overlap between the pressure traces 52 is detected. For long dwell times a simple integration of the pressure trace 52, calibrated through mass balanced measurement allows one to obtain quantitative information related to each individual injection event.

However, in determining quantitative information for injection events having short dwell times cross correlation is required between the optical signal 50 and the pressure trace 52. Cross correlation is needed due to the overlap 56 in the pressure traces 52.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of any claims that are derivable from the description herein, and any and all equivalents thereof.

What is claimed is:

1. An apparatus for testing a fuel injector having a nozzle tip portion comprising:

a fixture assembly having an injector receiving opening sized to receive the fuel injector therein;

a spray chamber housed within the fixture assembly and sized to receive the nozzle tip portion of the injector, whereby the spray chamber receives fluid injected by the injector during an injection event when the injector is actuated;

a flow meter fluidly connected to the spray chamber measuring a flow of the injected fluid;

a fiber optic operatively aligned with the nozzle tip whereby light is directed into the chamber and towards the nozzle tip; and an optical detection assembly for detecting the intensity of light within the chamber.

2. The apparatus for testing a fuel injector of claim 1, wherein the fiber optic includes at least one fiber for emitting a light and at least one fiber for receiving a light.

3. The apparatus for testing a fuel injector of claim 1, wherein the optical detection assembly includes a fiber optic for receiving a light within the chamber and directing the received light to a computing device for quantifying the intensity of the light, whereby cavitation can be detected within the spray chamber indicating an injection event upon the detection of increased intensity of the received light.

4. The apparatus for testing a fuel injector of claim 3, wherein the detection assembly includes a plurality of fiber optic fibers.

5. The apparatus for testing a fuel injector of claim 1, further including a temperature sensor affixed inside the spray chamber, said temperature sensor operably connected to a computing device.

6. The apparatus for testing a fuel injector of claim 1, further including a computing device electronically connected to the flow meter and the optical detection assembly.

7. The apparatus for testing a fuel injector of claim 1, further including a dampener fluidly connected to the flow meter for dampening flow fluctuations to the flow meter.

8. The apparatus of claim 1, further including a pressure sensor housed within a pressure chamber, wherein the pressure chamber is fluidly connected to the spray chamber.

9. The apparatus of claim 8, further including an isolating orifice fluidly connected to both the spray chamber and the pressure chamber isolating and restricting the flow of injected liquid between the spray chamber and the pressure chamber, whereby pressure waves and reflections are greatly reduced within the pressure chamber for reducing noise in the recording of a pressure reading by the pressure sensor.

10. An apparatus for testing a fuel injector having a nozzle tip portion comprising:

a fixture assembly having an injector receiving opening sized to receive the fuel injector therein;

a spray chamber housed within the fixture assembly and sized to receive the nozzle tip portion of the injector, whereby the spray chamber receives fluid injected by the injector during an injection event when the injector is actuated;

a pressure chamber fluidly connected to the spray chamber and housing a pressure sensor;

an isolating orifice fluidly connected to both the spray chamber and the pressure chamber isolating and restricting the flow of injected liquid between the spray chamber and the pressure chamber, whereby pressure waves and reflections are greatly reduced within the pressure chamber for reducing noise in the recording of a pressure reading by the pressure sensor;

a flow meter fluidly connected to the spray chamber measuring a flow of the injected fluid;

a fiber optic operatively aligned with the nozzle tip whereby light is directed into the chamber and towards the nozzle tip; and an optical detection assembly for detecting the intensity of light within the chamber.

11. The apparatus of claim 10, further including a surge arrester fluidly connected to the spray chamber.

12. The apparatus for testing a fuel injector of claim 10, wherein the fiber optic includes at least one fiber for emitting a light and at least one fiber for receiving a light.

13. The apparatus for testing a fuel injector of claim 10, wherein the optical detection assembly includes a fiber optic for receiving a light within the chamber and quantifies the intensity of the light, whereby cavitation can be detected within the spray chamber indicating an injection event upon the detection of increased intensity of the received light.

14. The apparatus for testing a fuel injector of claim 10, further including a temperature sensor affixed inside the spray chamber, said temperature sensor operably connected to a computing device.

15. The apparatus for testing a fuel injector of claim 10, further including a computing device electronically connected to the flow meter, pressure sensor and the optical detection assembly.

16. The apparatus for testing a fuel injector of claim 10, further including a dampener fluidly connected to the flow meter for dampening flow fluctuations to the flow meter.

17. The apparatus of claim 10, wherein the spray chamber extends horizontally out from the nozzle tip whereby the spray chamber takes on a cylindrical disk shape perpendicular to the nozzle tip.

18. A method of measuring an amount of fuel injected by a fuel injector comprising the steps of:

securing a fuel injector to a fixture assembly for capturing fuel injected by the fuel injector;

actuating the fuel injector to create fuel injection event into a spray chamber;

measuring the pressure of the fuel injected into the spray chamber;

measuring the flow of fuel from the injector during the injection event;

directing a light into the spray chamber;

determining the start and stop times of injection by measuring the intensity of light within the spray chamber; and determining injection information regarding the injection event based upon the measured pressure and measured flow.

19. The method of claim 18, further including isolating the flow of the fuel resulting from the injection event flowing into a pressure chamber, whereby pressure waves and reflections are greatly reduced within the pressure chamber by restricting the flow into the pressure chamber.

20. The method of claim 18, further including purging air prior to measuring the pressure of the fuel injected.

21. The method of claim 18, further including introducing a back pressure into the spray chamber whereby the resolution of the spray plume is sharpen.

22. The method of claim 18, further including determining the start of injection and end of injection by detecting cavitation within the spray chamber.

23. The method of claim 22, wherein the cavitation is determined by an increase of intensity of the detected light.

24. The method of claim 18, further including determining a background intensity of light within the spray chamber wherein the background intensity corresponds to the lack of cavitation within the spray chamber.

25. The method of claim 18, further including applying gun blue coloring to the nozzle tip.

* * * * *